United States Patent
McDonald et al.

(10) Patent No.: US 6,563,779 B1
(45) Date of Patent: May 13, 2003

(54) TRACKING ERROR SIGNAL GENERATION USING CONFOCALLY FILTERED DETECTION

(75) Inventors: Mark E. McDonald, Mountain View, CA (US); Robert R. McLeod, Morgan Hill, CA (US); Andrew J. Daiber, Palo Alto, CA (US)

(73) Assignee: Siros Technologies, Inc., Davis, CA (US)

( * ) Notice: Subject to any disclaimer, the term of this patent is extended or adjusted under 35 U.S.C. 154(b) by 63 days.

(21) Appl. No.: 09/595,433

(22) Filed: Jun. 15, 2000

Related U.S. Application Data (60) Provisional application No. 60/139,561, filed on Jun. 16, 1999.

(51) Int. Cl.[7] .................................................. G11B 7/00
(52) U.S. Cl. ...................................... 369/103; 369/118
(58) Field of Search ........................... 369/44.11, 44.24, 369/44.23, 118, 103

(56) References Cited

U.S. PATENT DOCUMENTS

| | | | |
|---|---|---|---|
| 4,464,741 A | 8/1984 | Compaan | 369/45 |
| 4,612,437 A | 9/1986 | Ohsato | 250/201 |
| 4,631,397 A | 12/1986 | Ohsato et al. | 250/201 |
| 4,775,968 A | 10/1988 | Ohsato | 369/46 |
| 4,924,455 A | 5/1990 | Fujiie et al. | 369/44.21 |
| 5,157,555 A | 10/1992 | Reno | 359/823 |
| 5,430,701 A | 7/1995 | Ito et al. | 369/44.41 |
| 5,513,158 A | 4/1996 | Ohsato | 369/44.23 |
| 5,590,110 A | 12/1996 | Sato | 369/100 |
| 5,610,895 A | 3/1997 | Izumi et al. | 369/112 |
| 5,659,536 A * | 8/1997 | Maillot et al. | 369/118 |
| 5,724,334 A * | 3/1998 | Ohba et al. | 369/118 |
| 6,111,828 A | 8/2000 | McLeod et al. | 369/44.23 |

\* cited by examiner

*Primary Examiner*—Nabil Hindi
(74) *Attorney, Agent, or Firm*—Sierra Patent Group, Ltd.

(57) ABSTRACT

A tracking error signal generation apparatus and method which utilizes confocal detection with a split detector and a differencing circuit for generation of tracking error signals. A first lens is positioned in the path of a light beam returning from an optical medium. A pinhole is positioned in the path of the light beam after the first lens and proximate to the focal plane of the first lens. A second lens is positioned in the path of the light beam after the pinhole, and a split detector, having equal halves is positioned in the path of the light beam after the second lens. A differencing circuit is operatively coupled to each of the halves of the split detector. In operation, a light beam is focused by an optical head onto a track in the optical medium, and the reflection of the beam from the optical medium is directed through the first lens, through the pinhole, through the second lens, and onto the split detector. When the focus of the light beam is centered on the track, the reflected light reaching the split detector is evenly distributed on the two halves of the detector, such that the differencing circuit will generate a tracking error signal (TES) having nominally a zero value. When the focus of the light beam is off-center with respect to the track, the reflected light received by detector is unevenly distributed on the two halves of the detector such that the differencing circuit generates a non-zero tracking error signal, which will be of positive or negative value depending upon the direction off-center of the light beam focus spot. The tracking error signals thus generated are communicated to a servo system which will reposition the optical head to maintain the light beam focus spot on the center of the track.

3 Claims, 10 Drawing Sheets

TRACKING ERROR SIGNAL GENERATION USING CONFOCALLY FILTERED DETECTION

RELATED APPLICATION DATA

This patent application is entitled to the benefit of Provisional Patent Application Ser. No. 60/139,561, filed on Jun. 16, 1999, by inventors McDonald et al. This application is related to: U.S. patent application Ser. No. 09/229,140, filed on Jan. 12, 1999 by inventors McCleod et al.; U.S. patent application Ser. No. 09/229,012, filed on Jan. 12, 1999 by inventors McDonald et al.; U.S. patent application Ser. No. 09/229,138 filed on Jan. 12, 1999 by McDonald et al.; and U.S. patent application Ser. No. 09/229,505, filed on Jan. 12, 1999 by inventor R. McCleod.

BACKGROUND OF THE INVENTION

1. Field of the Invention

This invention pertains generally to systems and devices for tracking error signal generation and tracking error correction associated with writing and reading of optical data storage media. More specifically, the invention is a tracking error signal generation apparatus and method which utilizes confocal detection with a split detector and a differencing circuit for generation of tracking error signals.

2. Background

Various systems and methods for tracking error correction are known and used for writing and readout of optical data storage media. As optical media structures have become more complex and higher storage densities are achieved, improved tracking error correction systems are needed. There is accordingly a need for an improved tracking error signal generation apparatus and method. The present invention satisfies this need, as well as others, and generally overcomes the deficiencies found in the background art.

SUMMARY OF THE INVENTION

The invention is a tracking error signal generation apparatus and method which utilizes confocal detection with a split detector and a differencing circuit for generation of tracking error signals. In its most general terms, the invention comprises a first lens positioned in the path of a light beam reflected from (or transmitted through) an optical medium, a pinhole positioned in the path of the light beam proximate to the focal plane of the first lens, a second lens positioned in the path of the light beam after the pinhole, a split detector, having equal halves, positioned in the path of the light beam after the second lens, and a differencing circuit operatively coupled to each of the halves of the split detector. The reflected light beam will generally comprise a read beam on a return path from the optical medium. The second lens is positioned so that the focused beam emerging from the pinhole is re-imaged onto the split detector.

The invention is used with optical media having track patterns having differing reflectivity (or transmissivity) from the surrounding portions of the optical media, typically with the track having a higher reflectivity. In operation, a light beam is focused by an optical head onto a track in the optical medium, and the reflection of the beam from the optical medium is directed through the first lens, through the pinhole, through the second lens, and onto the split detector. When the focus of the light beam is centered on the track, the reflected light reaching the split detector is symmetrically and evenly distributed to the two halves of the detector, such that the differencing circuit will generate a tracking error signal (TES) having nominally a zero value. When the focus of the light beam is off-center, the reflected light received by detector is asymmetrically distributed on the two halves of the detector such that the differencing circuit generates a non-zero tracking error signal, which will be of positive or negative value depending upon the direction off-center of the light beam focus spot. The tracking error signals thus generated are communicated to a servo system which will reposition the optical head to maintain the light beam focus spot on the center of the track.

The invention is particularly well suited for use with optical data storage media wherein tracks are defined by format grating structures. In one preferred embodiment, the optical media include a format hologram grating structure having vertical strips with high contrast carrier fringes separated by vertical strips with low contrast carrier fringes such that the high contrast carrier fringes define tracks. For disk shaped media the tracks are concentric and extend circumferentially around the medium to define cylindrical shells. Tracking is carried out by focusing the read spot on the center of the cylindrical shell or track.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Referring now to FIG. 1 through FIG. 8, a system and method for tracking error signal generation using confocally filtered detection is generally shown. The invention is disclosed primarily in terms of use with optical media having complex format hologram grating structures which define cylindrical shells usable as tracking patterns for tracking error signal generation. The invention, however, may be used with a variety of different optical media including, for example, optical media having embossed or stamped track patterns on a servo surface, or track patterns embedded in a physical data layer, to provide for tracking error signal generation and tracking error correction. Those of ordinary skill in the art will realize that the following description of the present invention is illustrative only and is not intended to be in any way limiting. Other embodiments of the invention will readily suggest themselves to such skilled persons from an examination of the within disclosure.

Figure 1A:
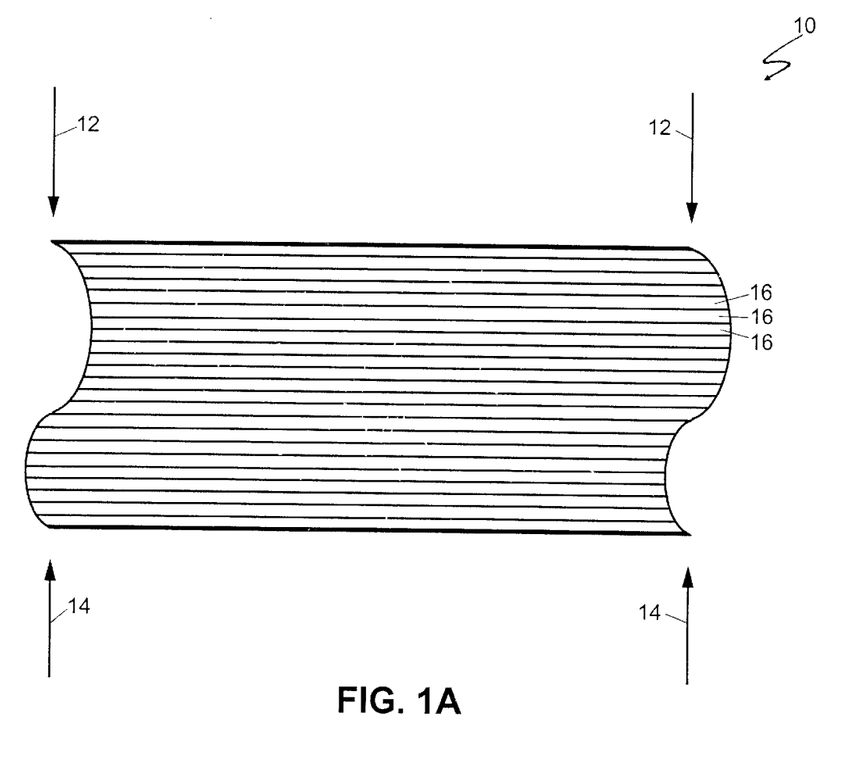
FIG. 1A is an illustration of a simple format hologram grating structure being written by exposing holographic storage medium to two beams of mutually coherent light.

Referring first to FIG. 1A, there is shown a simple format volume hologram 10, which is formed or written by exposing a holographic material, such as a photopolymer, to two beams 12, 14 of mutually coherent light. The format hologram may be defined by, for example, a variation in refractive index in the optical medium. In particular, FIG. 1A shows two plane waves incident from opposing sides generate a planar reflection hologram with a plurality of fringes 16, whose orientation and spatial frequency are governed by the wavelength and angles of incidence of the beams. For optimal reflection, the hologram 10 is Bragg-matched at the readout to a range of angles within the cone of the focused readout beam. This property is the basis of data storage by selective localized alteration of a format hologram grating structure. Selective localization of format holograms is described in detail in U.S. patent application Ser. No. 09/016,382, filed on Jan. 30, 1998 by inventors Hesselink et al., entitled "Optical data Storage By Selective Localized Alteration Of A Format Hologram", the disclosure of which is incorporated herein by reference. The selective localized alteration serves to change the reflectivity at the waist of a focused beam that can be measured using confocal detection; in this manner, data are represented by the localized changes in reflectivity of the format hologram. Data can be stored at multiple depths within the optical medium.

A variety of complex format holograms can be generated under different conditions. Of particular interest in this invention are complex format hologram grating structures having cylindrical shells or cylinders 18, as shown schematically in FIG. 1B. The formation of complex format hologram structures, including cylindrical shell structures, is discussed in detail in U.S. patent application Ser. No. 09/229,457, filed on Jan. 12, 1999, by inventors Daiber et al., the disclosure of which is incorporated herein by reference. For optical media or disks which are formatted with a cylinder format grating structure as in FIG. 1B, a laser beam reflected off the medium will experience higher reflectivity from the center or middle portion of a cylindrical shell, while a lower reflectivity is obtained from regions between the cylindrical shells. Data can be stored at multiple depths within each cylindrical shell using selective alteration of the format grating structure in the cylindrical shell.

Figure 1B:
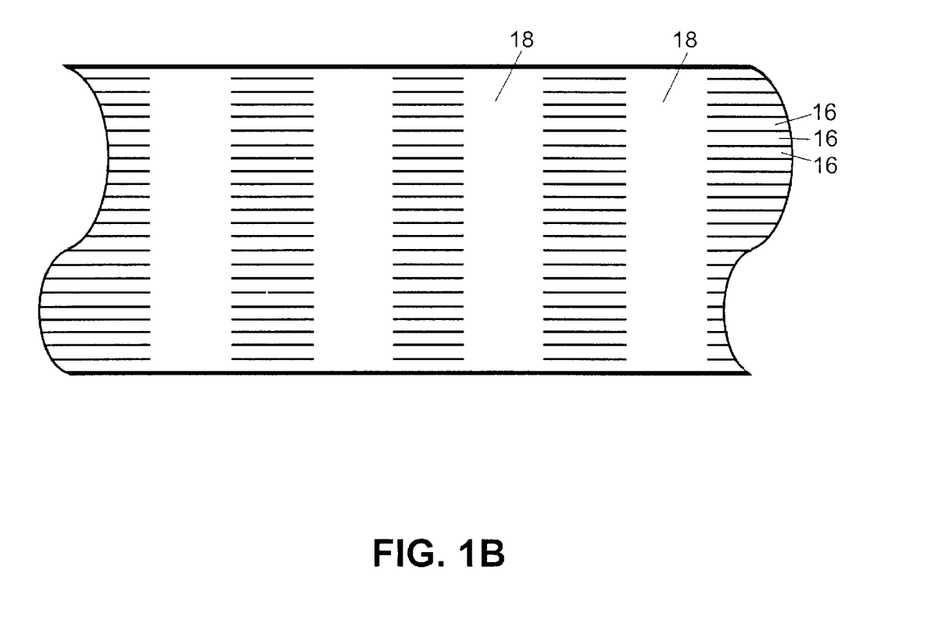
FIG. 1B is an illustration of a complex format hologram grating structure having a cylindrical shell structure. Information is provided in the form of format grating structures which define data tracks.
Figure 2A:
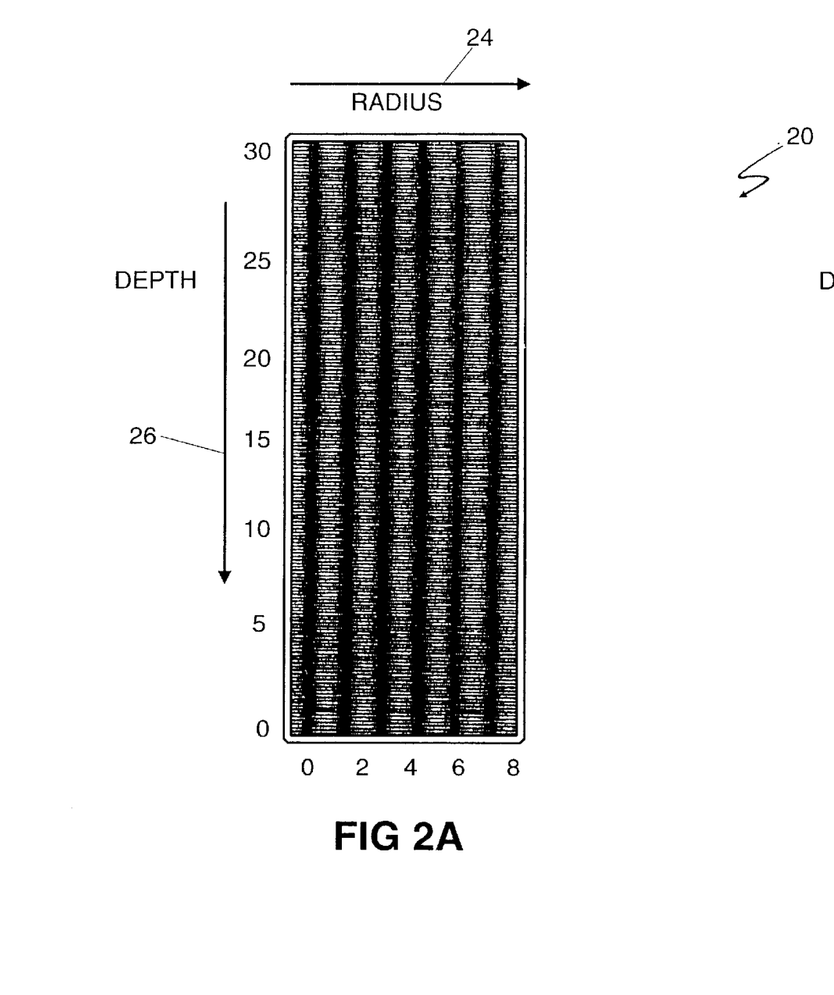
FIGS. 2A and 2B are cross sectional views of format hologram grating structures having two and four constituent holograms, respectively, for track and layer definition.
Figure 2B:
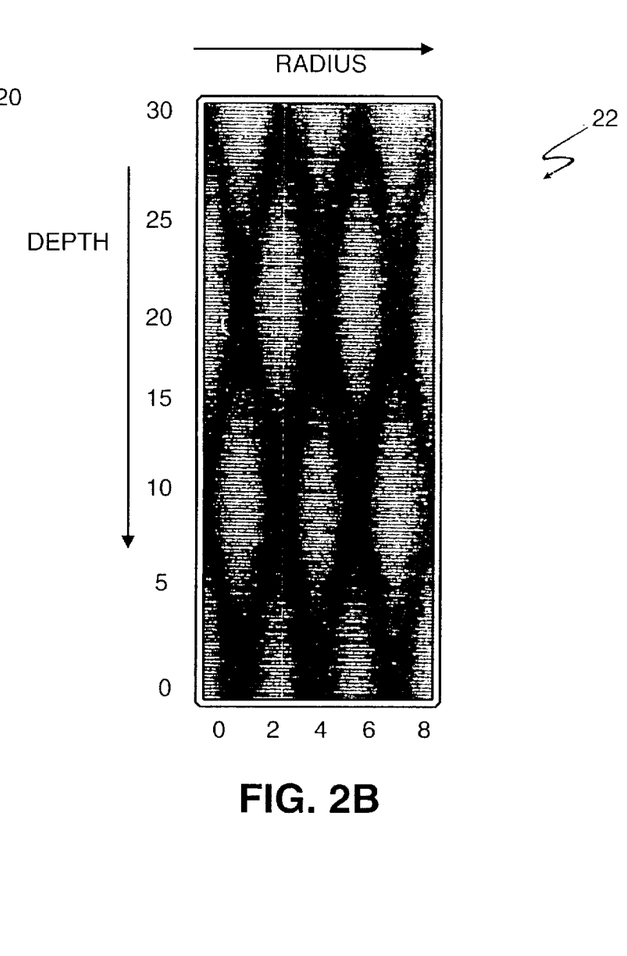
Figure 3A:
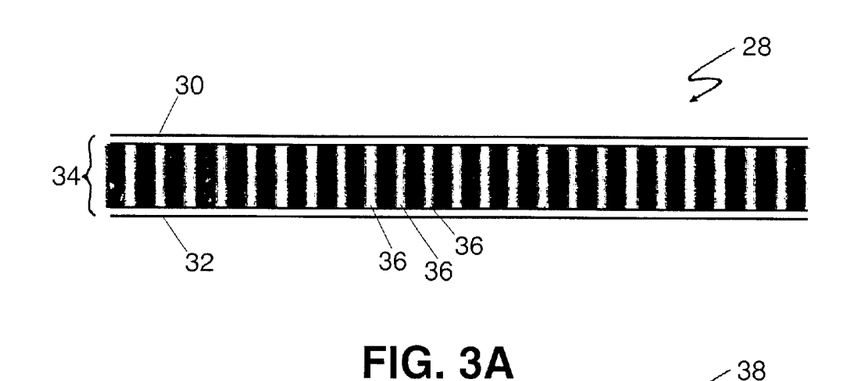
FIGS. 3A and 3B are cross sectional views of the optical storage devices containing the format hologram grating structures depicted in FIGS. 2A and 2B, respectively.
Figure 3B:
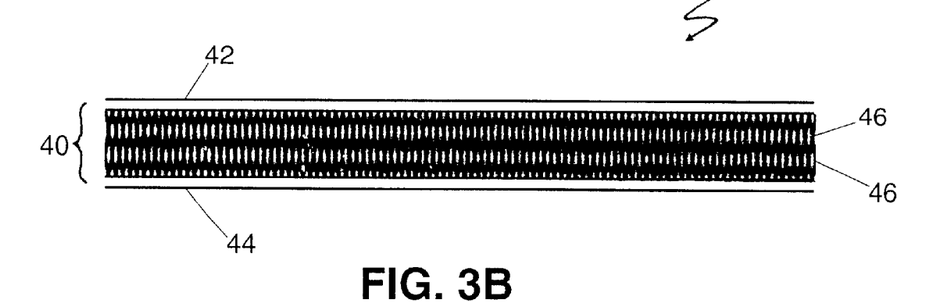

FIGS. 2A and 2B and corresponding FIGS. 3A and 3B show examples of optical storage media that have multiple data tracks defined by format grating structures. FIG. 2A is a cross-sectional view of a format hologram grating structure 20 having two constituent holograms for track definition, while FIG. 2B is a cross-sectional view of a format hologram grating structure 22 having four constituent holograms for track definition. The radius or radial direction of the format hologram grating structures 20, 22, is shown by horizontal axis 24, while the depth of format hologram grating structures 20, 22 is shown by vertical axis 26. FIG. 1B is a schematic view of an optical medium corresponding to FIG. 2A and FIG. 2B.

The format hologram grating structure 20 of FIG. 2A includes vertical strips with high contrast carrier fringes separated by vertical strips with low contrast carrier fringes (carrier fringes are the higher frequency variations in the index of refraction to which a focussed beam can be Bragg-matched). In an optical disk shaped medium, the cross section pattern of FIG. 2A and FIG. 2B will sweep circumferentially around the medium so that the tracks define cylinder shells of high contrast that extend from the top to the bottom of the holographic material. The cylinder shells are concentric with respect to the rotational axis (not shown) of the disk-shaped medium. Cylinder format structures can be defined by superimposition of two conical gratings of opposite orientation wherein the local grating vectors are at symmetric angles with respect to the surface of the optical recording material, as described in detail in U.S. patent application Ser. No. 09/229,457 and noted above. A variety of conical grating structures are possible to achieve desired Bragg-matching and radial spacing or period (for disk-shaped media) of cylindrical shells.

FIG. 3A is a cross-sectional view of an optical data storage device 28 which corresponds generally to the format hologram grating structure of FIG. 2A. The storage device 28 includes transparent top and bottom layers or covers 30, 32 which enclose an optical recording medium 34 such as a photopolymer material. Layers 30, 32 may comprise, for example, a glass or polymeric material such as polycarbonate. FIG. 3A shows the envelope of the local index perturbation of holographic storage medium 34 for which the carrier frequencies have been removed A format hologram grating structure is recorded in medium 34 and defines a plurality of cylindrical shells or tracks shown as peaks or bright strips 36. Generally, a reflected signal from a focused light beam will be strongest when centered on a peak or strip 36. FIG. 3B is a cross-sectional view of an optical data storage device 38 which corresponds generally to the format hologram grating structure of FIG. 2B. Storage device 38 includes an optical recording medium 40 contained by top and bottom covers 42, 44, and a format hologram grating structure recorded in medium 40 defines a plurality of tubular tracks 46.

Figure 4A:
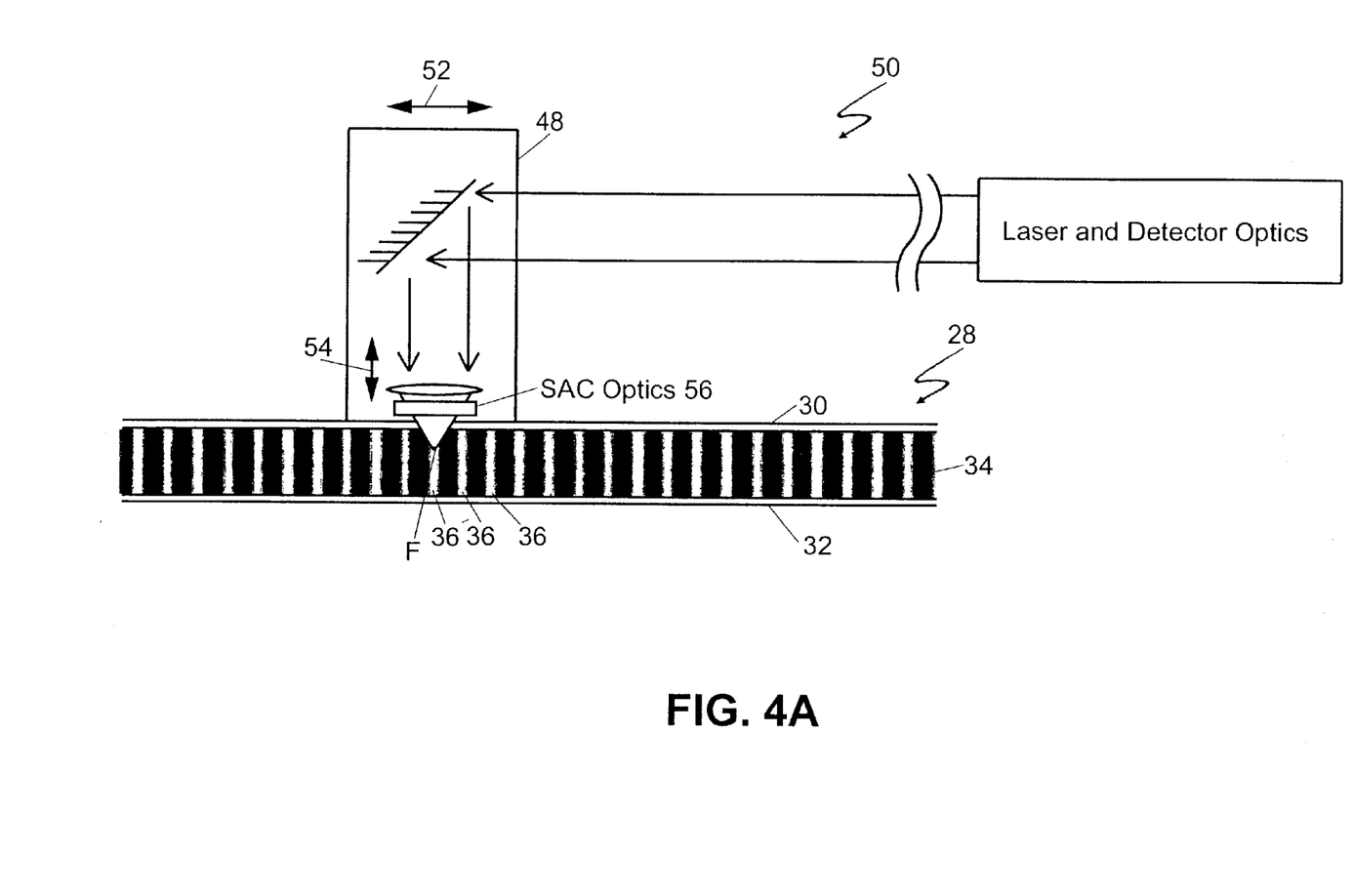
FIG. 4A is a schematic diagram of an optical head of an optical delivery and detection system in relation to a grating envelope of a radial format hologram grating structure.

Referring now to FIG. 4A, a schematic of an optical head 48 component of an overall optical delivery and detection system 50 is shown together with a portion of the optical disk 28 of FIG. 3A. The optical head 48 can be moved radially, as shown by arrow 52, and in depth, as shown by arrow 54, to access different portions of the holographic storage medium 34 of disk 28. Optical head 48 may also comprise spherical aberration correction (SAC) optics 56 which are described further below. The illustrated holographic storage medium 34 has a format hologram grating structure stored therein. A variety of optical head systems are well known in the art which are suitable for use as optical head 48, and the details of the structure of optical head 48 are not disclosed herein to avoid overcomplication of the disclosure. The construction of one optical head suitable for use with the invention for measuring reflected intensity at a particular depth or radial position in a medium is described in detail in U.S. patent application Ser. No. 09/016,382, noted above.

In the case of disk-shaped optical medium 28, rotation brings different angular portions of the holographic storage medium 34 into optical communication with the optical head 48. In the case of a medium formed in card or tape (not shown), linear motion brings different lateral portions of the holographic storage medium to the optical head. FIG. 4A illustrates generally the position of the optical head 48 in relation to a grating envelope of a format hologram grating structure having a plurality of radially spaced tracks 36. As a function of the radial position of the focus F, the reflected intensity is greatest when the focus is positioned at the center of a track 36, and least when positioned between the tracks 36.

Figure 4B:
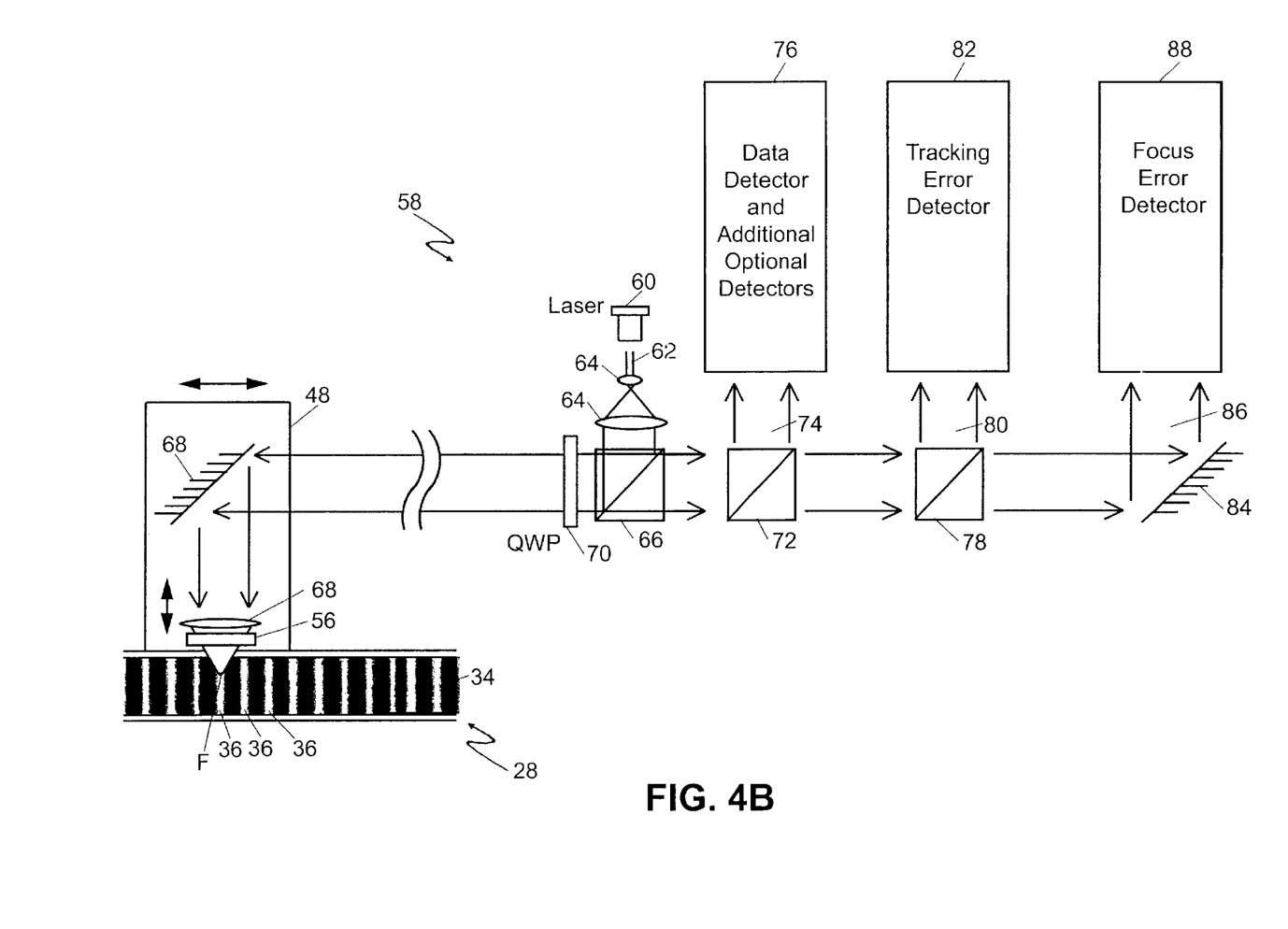
FIG. 4B is a schematic drawing of an optical head of an optical delivery and detection system in relation to a grating envelope of a depth and radial format hologram grating structure.

Referring to FIG. 4B, there is shown an optical delivery and detection system 58 in accordance with the present invention, wherein like reference numbers are used to denote like parts. A laser 60 illuminates a beam 62 that is expanded by beam expansion optics 64 and directed towards the holographic storage medium 34 in disk 28. Once the beam 62 is expanded it passes through a polarizing beam splitter 66 where it is directed towards a first corner turning mirror 68 located within the optical head 48 and then directed towards an objective lens 68. Variable spherical aberration correction (SAC) optics 56 can be used in conjunction with objective lens 68 to focus on different layers (not shown) within the holographic storage medium 34. The use of SAC optics 56 is particularly important when trying to reach a range of depths within the storage medium 34 in excess of approximately 100 microns.

On the forward and return paths for beam 62 from laser 60, light passes through a quarter wave plate 70 that serves to change the polarization of the beam. The use of the polarizing beam splitter 66 and the quarter wave plate 70 serves to increase the efficiency of the overall system 58. Alternatively, a standard 50/50 beam splitter can be used in place of the polarizing beam splitter 66 and the quarter wave plate 70. Once the polarization has been changed, the beam passes through the polarizing beam splitter 66. The polarizing beam splitter 66 recognizes the change in polarization and directs the beam towards several operational paths. A fraction of the light is split in the direction of each path. A standard 50/50-beam splitter 72 directs a portion of the light in a data path 74 towards a data detector 76 and additional optional detectors (not shown). The portion of light not directed toward the data path 74 is directed towards a second 50/50-beam splitter 78 that serves to direct a portion of the light in a tracking path 80 toward a tracking error detector 82. The portion of light not directed toward the tracking path 80 is directed towards optional second corner turning mirror 84. Finally, the light is reflected off the corner turning mirror 84 in an autofocus path 86 toward a focus error detector 88. The optical delivery and detection system of FIG. 4B is also described in U.S. patent application Ser. No. 09/229,140, filed on Jan. 12, 1999 by McCleod et al, entitled "Focus Error Signal Generation Using Confocally Filtered Detection", the disclosure of which is incorporated herein by reference.

Figure 5A:
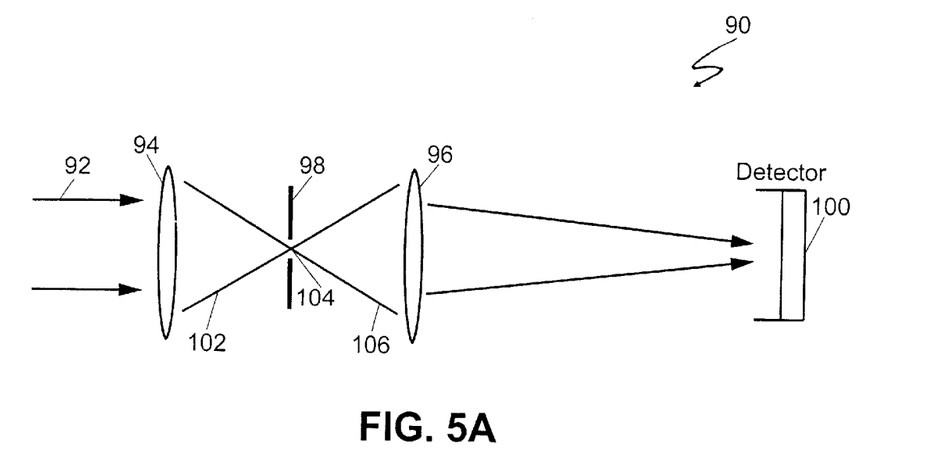
FIG. 5A is a schematic illustration of one presently preferred embodiment tracking error signal generation device in accordance with the invention.

Referring also to FIG. 5A, a tracking error signal (TES) generator apparatus 90 in accordance with the invention is shown. Tracking error signal generator 90 will generally comprise part of the tracking error signal detector system 82 of FIG. 4B. Light beam 92 in FIG. 5 generally comprises a read beam on a return path from an optical medium such as medium 34. Light returned from medium 34 will be strongest when the read beam is focused on the center of a cylinder or track 36, and thus the center of cylinders 36 serve as the center of the data tracks of medium 34.

The tracking error signal generator apparatus 90 generally comprises first and second lenses 94, 96 a pinhole element 98 positioned therebetween at the focal plane of first lens 94, and a detector 100 positioned behind second lens 96. Light beam 92 passes through lens 94, and a beam 102 emerging from lens 94 passes through pinhole at the focus of lens 94. The pinhole 98 is positioned so that the focus 104 of the beam in the storage medium is re-imaged on the pinhole 98. Lens 96 focuses beam 106 emerging from pinhole 98 onto detector 100 such that pinhole 98 is re-imaged onto detector 100.

Figure 5B:
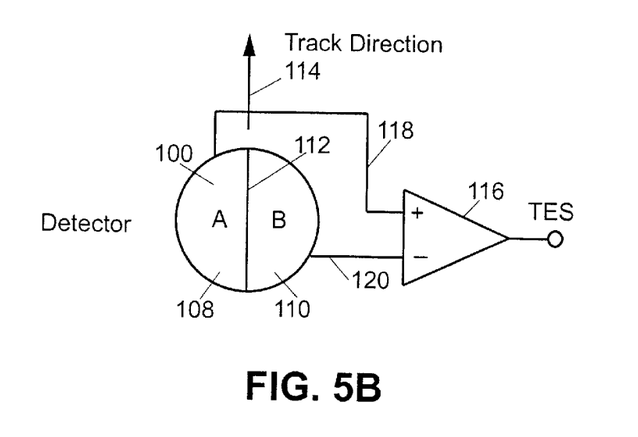
FIG. 5B is a schematic front elevation view of the detector of the tracking error signal generation device of FIG. 5A shown with a differencing circuit.

Referring also to FIG. 5B, detector 100 is preferably a split detector with an "A" half 108 and a "B" half 110. The bisector 112 of detector is oriented such that it is generally parallel with the track direction as shown by arrow 114. A differencing circuit 116 is operatively coupled to detector halves 108, 110 by conductors 118, 120 respectively, and differences the output voltage from halves 108, 102 to generate a tracking error signal TES.

Figure 6:
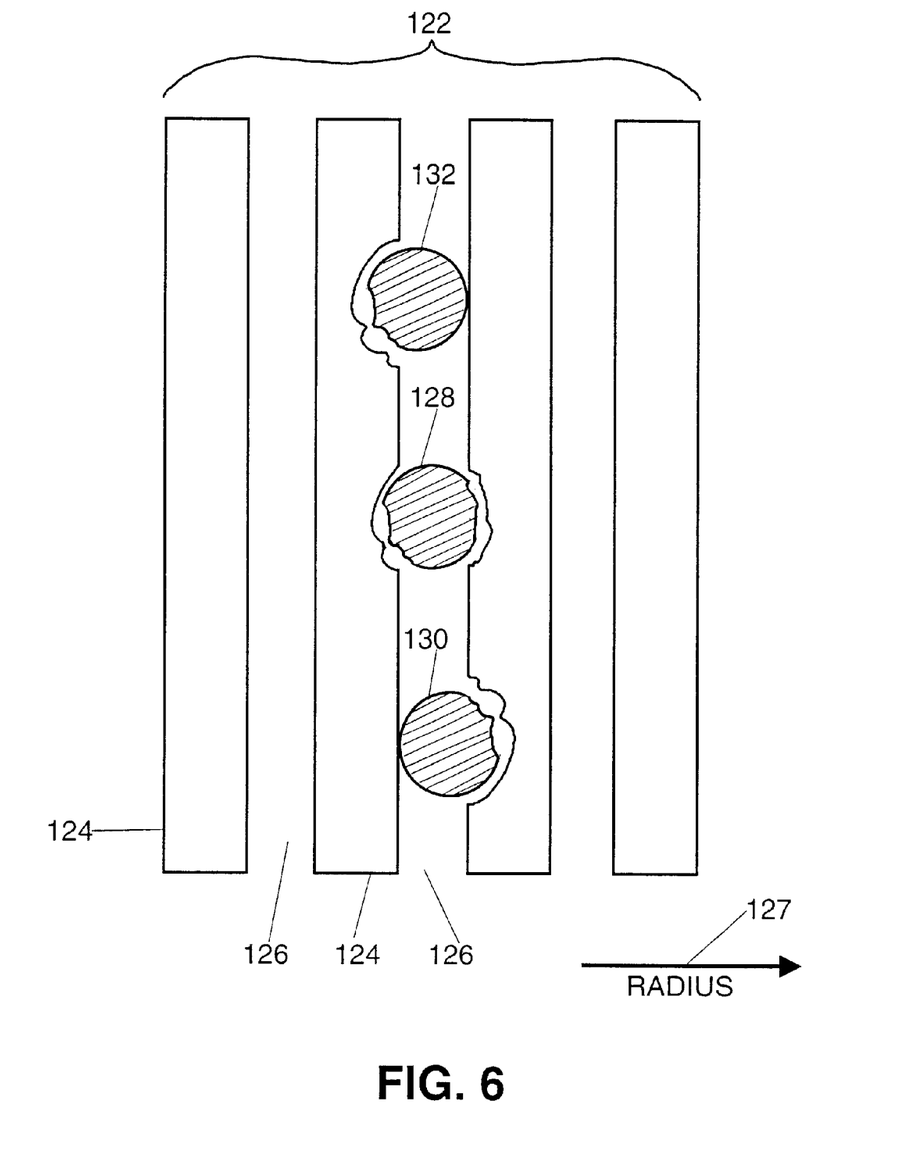
FIG. 6 is a schematic top plan view of an optical medium with cylinder track formatting showing laser spots relative to a cylinder track.

Referring now to FIG. 6 as well as FIG. 5A and FIG. 5B, there is shown a top plan schematic view of an optical medium 122 having cylinder track formatting with carrier fringes 124, 126. The high contrast of carrier fringes 126 provides high reflectivity for a focused beam as determined by confocal detection, while the low contrast of carrier fringes 124 provides a corresponding low reflectivity for a focused beam. Three different focused read spots 128, 130, and 132 are shown on optical medium 122. Focused spots 128, 130, 132 are shown generally as they would be produced by the optical head 48 described above upon focusing the read beam onto a particular depth and onto a particular track 126 in medium 122. Spot 128 is shown as centered with respect to a carrier fringe or track 126. Spot 130 is shown positioned off-track to the outside of the carrier fringe 126, and spot 132 is shown positioned off-track to the inside of carrier fringe or cylinder 126. Optical medium 122 is preferably in the form of an optical disk, and arrow 127 indicates the radially outward direction from the center of the optical disk. Fringes 124, 126 have a curvature (not shown) according to the radius of the disk.

Figure 7A:
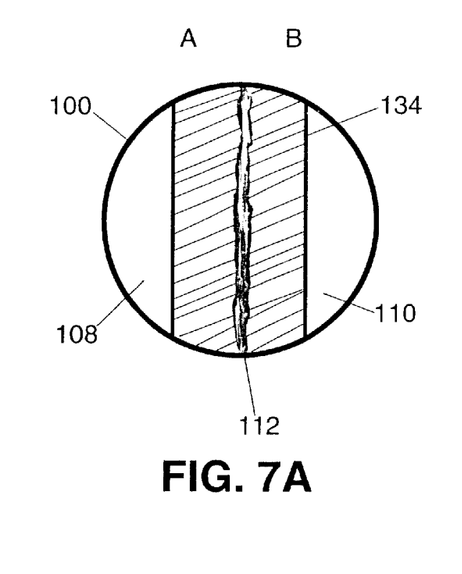
FIG. 7A is a schematic representation of the light reflected by the centered laser spot of FIG. 6, as received by the detector of FIG. 5B.

When optical head 48 focuses light onto the center of a cylinder 126 as shown by laser spot 128, where carrier fringe contrast is the greatest, a symmetrical reflection from the focused spot 128 is imaged through pinhole 98 onto split detector 100. The reflected light profile on detector 100 for centered spot 128 is shown in FIG. 7A as shaded region 134. Shaded region 134 is positioned symmetrically about centerline or bisector 112 such that equal portions of shaded region 134 are received by the "A" half 108 and "B" half 110 of split detector 100. Shaded region 134 represents generally a "strip" of higher reflectivity which is centered with respect to bisector line 112 on detector 100, and represents the reflection from the cylinder shell 126 illuminated by the focused beam spot 128. The tracking error signal or TES generated by differencing circuit 116 corresponding to the reflected light detected by the "A" half 108 and a "B" half 110 of detector is (A-B), which is nominally zero (no tracking error) in the case where spot 128 is centered on track 126.

Figure 7B:
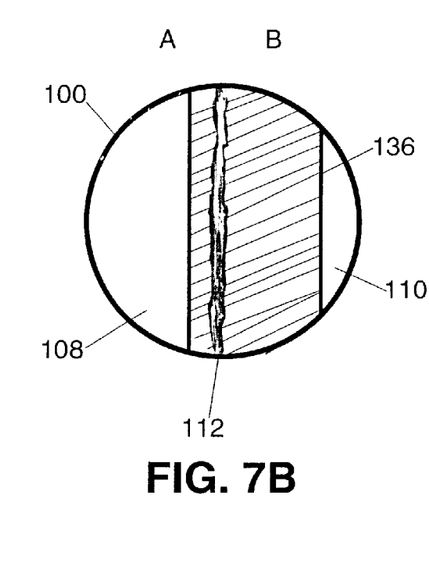
FIG. 7B is a schematic representation of the light reflected by the laser spot outside the center of the track of FIG. 6, as received by the detector of FIG. 5B.

When optical head 48 focuses light off track to the outside of cylindrical track 126, as shown by focus spot 130, the inside portion of the reflected light will be greater than the outside portion, and thus the strip of reflectivity imaged onto detector 100 will be shifted with respect to bisector line 112. FIG. 7B illustrates the reflected light profile on detector 100 corresponding to outside spot 130. In FIG. 7B, a shaded region 136, which represents the strip of higher reflectivity. The shaded region 136 indicates that the strip of reflectivity from spot 130 is offset from the center of pinhole 98, and is correspondingly shifted with respect to bisector line 112 so that it is not symmetrically positioned on detector 100. The reflectivity represented by shaded region 136 results in a smaller amount of reflected light being received on the "A" half 108 than the "B" half of detector 100, and the tracking error signal (A-B) from differencing circuit 116 will have a negative value, indicating that focus spot is off-center to the outside of track 126.

Figure 7C:
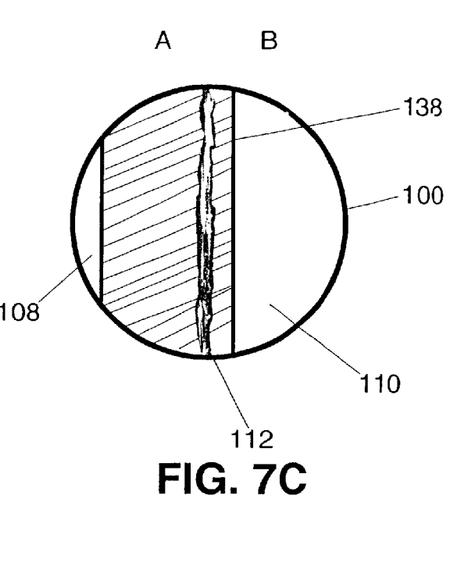
FIG. 7C is a schematic representation of the light reflected by the laser spot inside the center of the track of FIG. 6, as received by the detector of FIG. 5B.

When optical head 48 focuses light off track to the inside of cylindrical track 126, as shown by focus spot 132, the outside portion of the reflected light will be greater than the inside portion, and the strip of reflectivity imaged onto detector 100 will accordingly be shifted with respect to bisector line 112 of detector. In FIG. 7C, the reflected light profile on detector 100 corresponding to inside spot 132 is shown as a shaded region 138, which represents the strip of higher reflectivity. The shaded region 138 indicates that the strip of reflectivity from spot 132 is offset with respect to the center of pinhole 98, and is correspondingly shifted with respect to bisector line 112 so that it is not symmetrically positioned on detector 100. The reflectivity represented by shaded region 138 results in a greater amount of reflected light being received on the "A" half 108 than the "B" half of detector 100, and the tracking error signal (A-B) from differencing circuit 116 will have a positive value, indicating that focus spot is off-center to the inside of track 126.

Figure 8:
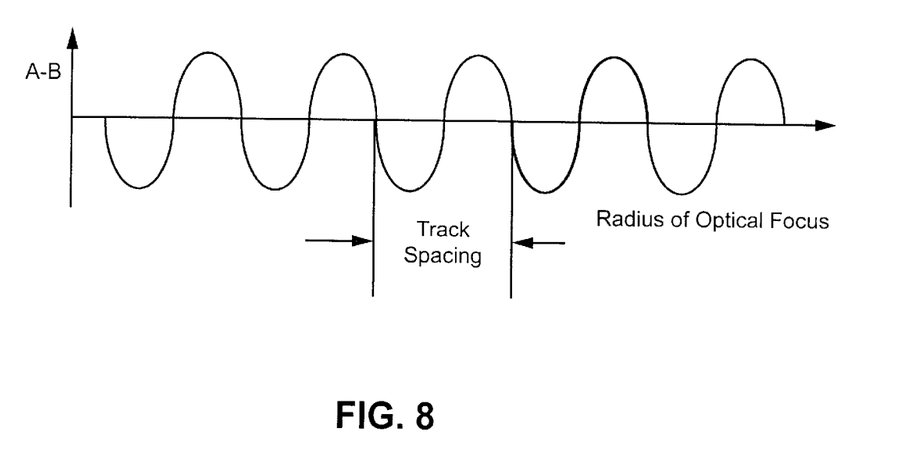
FIG. 8 is a graphical representation of the strength of the tracking error signal versus radius of optical focus, in accordance with a presently preferred embodiment of the present invention.

As can be seen from FIG. 7A through FIG. 7C, the value of the tracking error signal (A-B) is determined by the relative placement or position of the focused beam spot with respect to the track cylinder 126. The tracking error signal output by detector 100 and differencing circuit 116 with respect to the radial position of the focus spot is shown in FIG. 8 as signal voltage versus radial position of the focus spot. In FIG. 8, for example, a zero crossing with a negative slope indicates the position at which a focused beam is centered on a track cylinder 126, and a zero crossing with positive slope indicates the position at which a focused beam is centered between track cylinders 126. As the focus spot moves radially inward or outward across medium 122, a sinusoidal tracking error signal pattern as shown in FIG. 8 occurs.

In operation, optical head 48 will focus to a desired depth in medium 122 and along a selected track cylinder 126. Optical medium 122 rotates during readout of data, and the beam focus spot will track or follow along the selected track cylinder during readout. If, during readout, the focus spot moves outward and off-center from the track 126, a negative tracking error signal (A-B) will be generated as described above, and will be communicated to a servo system (not shown) which will make an appropriate radial positional correction to optical head 48 so that the focus spot is returned to the center of the track 126. If the focus spot moves inward and off-center during readout, a positive tracking error signal (A-B) results as described above, and the servo system will correspondingly re-position optical head 48 to maintain the focus spot on the center of track 126. If the tracking error signal (A-B) is zero value, the focus spot is tracking correctly and no re-positioning of optical head 48 is required. Numerous servo systems are well known in the art for providing tracking error correction responsive to tracking error signals, and the details of these well known systems are not disclosed herein.

For an ideal cylindrical format grating structure, for which an optical disk has cylinders defined by the beating of two ideal conical gratings of opposite orientation, use of a pinhole is not necessarily required for tracking error signal generation. Instead, a separate data detection arm can incorporate a pinhole for confocal detection. When variations in the cylindrical format grating structure are present, however, pinhole 98 serves to isolate the portion of the cylindrical format grating structure at a desired depth from possible offsets or other variations at other depths. This can occur, for example, if the conical holograms used to define the cylindrical shells are not strictly aligned with the axis of the disk.

The tracking error signal generation apparatus 90 can also be used for data detection by summing the output voltages of the "A" half 108 and "B" half 110 of detector 100. The pinhole 98 in apparatus 90 serves to isolate other data layers away from the data layer of interest. In general, for efficient confocal depth selection, the size of the pinhole is chosen to be approximately the size of the beam waist of a perfectly reflected return beam at the point of focus 104 of lens 94.

In order to transmit the features required for tracking error signal generation, the pinhole 404 must be large enough so that the spatial frequency content of the assymmetric reflection can transmit to the split detector 100, yet small enough to discriminate layers. This can be achieved for pinholes having a size in the range of one to two times the size of the beam waist of a perfectly reflected return beam at the point of focus 104 of lens 94. Those skilled in the art will recognize that the exact diameter of pinhole 98 will depend on the apodization of the beam and other system parameters. Generally, the diameter of pinhole 98 should be chosen to transmit approximately one radial period of the cylindrical shells, equal to the distance spanned by a strip of high reflectivity at the center of a cylindrical shell and a strip of low reflectivity between cylindrical shells.

In addition to tracking cylinder representations of tracks, the invention may be used to track other format grating structures such as the tubular track structures 46 shown in FIG. 3B and FIG. 2B. The tubular tracks 46 are provided at multiple depths in the optical medium for multiple data layers. Once focus is achieved on desired data layer at a desired depth, tracking error signal generation is carried out along a tube track, within the layer where the tube is located, in generally the same manner as described above for a cylinder track. Generally, a focussing method is used to keep the beam focus spot positioned on the selected layer. One such focussing method suitable for use with the invention is disclosed in U.S. patent application Ser. No. 09/229,140, noted above. For implementation of tracking on tubes, pinhole 98 also serves to filter out reflections from tubes at other depths or levels. The preferred pinhole size considerations related above apply for use with tubular tracking structures.

While the invention is described primarily in terms of use with optical media wherein tracks are defined by format grating structures, the invention may also be used with optical media wherein track structures are defined by stamped or embossed patterns, or via tracking patterns created by laser writing upon various types of optical media, including WORM type and multiple write/erase phase change media. The invention is also described in terms of use with a beam reflected off an optical medium. It will be readily apparent to those skilled in the art that the invention may also be used in transmission, with the tracking error detection apparatus of the invention positioned to receive a beam transmitted through the optical medium.

Accordingly, it will be seen that this invention provides a tracking error signal generation apparatus and method which allows effecting tracking error correction for optical media using format grating structures for tracks. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An optical data storage system comprising:

an optical storage medium having a format hologram grating structure that defines a plurality of tracks thereon, wherein said optical medium includes a format hologram grating structure recorded therein, said format hologram grating structure defines a plurality of radially spaced cylindrical shells, said radially spaced cylindrical shells defining said plurality of tracks;

an optical head positioned to focus a light beam on one of said plurality of tracks; and a tracking error signal generator configured to compensate for errors detected from said format hologram grating structure, said tracking error signal generator including a first lens positioned in a path of a beam returning from said optical storage medium, a pinhole positioned in said path after said first lens, a second lens positioned in said path after said pinhole, a split detector positioned in said path after said second lens, and differencing circuit operatively coupled to first and second halves of said split detector.

2. The optical data storage system of claim 1 wherein said plurality of tracks have a higher reflectivity than regions of said optical storage medium adjacent said plurality of tracks.

3. An optical data storage system comprising:

an optical storage medium having a format hologram grating structure that defines a plurality of tracks thereon, said format hologram grating structure defines a plurality of tubes at a plurality of depths within said optical storage medium, said tubes defining said plurality of tracks;

an optical head positioned to focus a light beam on one of said plurality of tracks; and a tracking error signal generator configured to compensate for errors detected from said format hologram grating structure, said tracking error signal generator including a first lens positioned in a path of a beam returning from said optical storage medium, a pinhole positioned in said path after said first lens, a second lens positioned in said path after said pinhole, a split detector positioned in said path after said second lens, and differencing circuit operatively coupled to first and second halves of said split detector.

\* \* \* \* \*